United States Patent

Edwards, III

[11] Patent Number: 5,266,360
[45] Date of Patent: Nov. 30, 1993

[54] INHIBITING COKE FORMATION BY COATING GAS TURBINE ELEMENTS WITH SILICA

[75] Inventor: William H. Edwards, III, Port St. Lucie, Fla.

[73] Assignee: United Technologies Corporation, Hartford, Conn.

[21] Appl. No.: 811,776

[22] Filed: Dec. 20, 1991

[51] Int. Cl.$^5$ .............................. B05D 3/02
[52] U.S. Cl. .................. 427/397.7; 427/226; 427/327; 427/435
[58] Field of Search .............. 427/226, 248.1, 397.7, 427/435, 327; 204/191.2

[56] References Cited

U.S. PATENT DOCUMENTS

| | | | |
|---|---|---|---|
| 4,099,990 | 2/1978 | Brown et al. | 427/255.1 |
| 4,117,868 | 10/1978 | Pignocco et al. | 138/146 |
| 4,145,462 | 3/1979 | Kuwabara et al. | 427/397.7 |
| 4,297,150 | 10/1981 | Foster et al. | 427/255.1 |
| 4,297,246 | 10/1981 | Cairns et al. | 252/465 |
| 4,371,570 | 2/1983 | Goebel et al. | 427/248.1 |
| 4,495,907 | 1/1985 | Kamo | 123/193 C |
| 4,554,897 | 11/1985 | Yamada et al. | 123/189 AA |
| 4,681,818 | 7/1987 | Unnam et al. | 204/192.15 |
| 4,692,234 | 9/1987 | Porter et al. | 106/1.25 |

Primary Examiner—Shrive Beck
Assistant Examiner—David M. Maiorana
Attorney, Agent, or Firm—Herbert W. Mylius

[57] ABSTRACT

A method is taught for protecting hydrocarbon contacting surfaces of a gas turbine engine from carbon deposition by the application of a coating of silica.

3 Claims, No Drawings

INHIBITING COKE FORMATION BY COATING GAS TURBINE ELEMENTS WITH SILICA

The invention was made under a U.S. Government contract and the Government has rights herein.

BACKGROUND OF THE INVENTION

1. Field of the Invention

This invention relates to methods for preventing the deposition of carbon, or coke, on fuel wetted surfaces located in high temperature zones of gas turbine engines. Coke deposition is an undesirable side effect caused by the catalytic-thermal degradation of hydrocarbon fuels during their consumption in gas turbine engines. Such deposition leads to performance loss, reduced heat transfer efficiencies, increased pressure drops, costly decoking procedures, and increased rates of material corrosion and erosion. The metals most prone to catalyze coke deposition are those metals commonly found in the alloys utilized in components exposed to high temperature, fuel wetted environments of gas turbine engines, typically found in jet engines in the combustor and afterburner fuel delivery systems.

2. Description of the Prior Art

Carburization, or the formation of coke deposits, has been noted particularly in high temperature environments where carbon containing fluids come in contact with metals or metal alloys. Exemplary of such environments are high temperature reactors, such as refinery crackers, thermal crackers, distillation units for petroleum feedstock, and gas turbine components. Conventional methods used to reduce coke formation and carburization in steam cracking operations involve the steam pretreatment of the surface to promote formation of a protective oxide skin. The surface may then be further protected by the deposition of a high temperature, stable, non-volatile metal oxide on the pre-oxidized substrate surface by thermal decomposition from the vapor phase of a volatile compound of the metal.

While the chemical vapor deposition of an alkoxysilane has been demonstrated to reduce the rate of coke formation in the pyrolysis section of an ethylene steam cracker by formation of an amorphous silica film on the internal surfaces of high alloy steel tubing at 700° to 800° C., no one to date has solved the problem of coke deposition on fuel contacting hardware in gas turbine engines.

SUMMARY OF THE INVENTION

The present invention relates to a means for reducing coke formation on fuel contacting components of gas turbines, such as in the combustor and afterburner of a jet engine. A thermally resistant barrier is applied to prevent contact of the fuel with catalytic agents such as iron, nickel, and chromium, contained in the base metals from which fuel contacting components are fashioned. Specifically, the fuel contacting components are coated with a thin, high temperature resistant layer of silica, which reduces the rate and severity of coke deposition on the surfaces.

DESCRIPTION OF THE PREFERRED EMBODIMENTS

Coke deposition has been found to be an undesirable side effect caused by the thermally accelerated degradation of hydrocarbon fuels during their use for power generation in gas turbine engines. It is a particular goal of the present invention to reduce the deposition of carbon on fuel contacting components of gas turbine engines such as fuel nozzles, fuel lines, and augmentor spray manifolds, and such other areas as lubrication systems and breather tubes.

It is known that hydrocarbon fuels may degrade either under high temperature conditions, i.e. thermally, or under lower temperature conditions in the presence of a catalytic material. One approach to the problem in the past has been to regulate the quality of the fuel consumed, so as to limit degradation thereof. However, as engines are required to run faster and hotter to achieve greater output, the ability of present day hydrocarbon fuels to provide the required performance without coking is lessened.

Further, since many of the metals required for the construction of higher temperature gas turbine engines are catalytic to the degradation of hydrocarbon fuels, coke formation has become of greater concern. Accordingly, a method has been sought to increase the temperature at which engines may operate without degradation of the fuel and deposition of coke. It has now been found that this may be achieved by the application of a suitable coating to fuel contacting surfaces to act as a barrier between the hydrocarbon and the catalytic elements in the surfaces. Certain high temperature resistant materials either do not participate in the mechanism of catalytic-thermal deposition of coke, or participate to a much lesser degree than such metals as iron, nickel, chromium, or their alloys. It has also been noted in the course of our investigations that certain materials actually enhance the degradation of carbon containing fuels. These same materials, when exposed to elevated temperatures, cause any gums and/or varnishes which do form to completely burn away. A suitable coating has been found to comprise a thin layer of silica, $SiO_2$, which may be applied by a number of methods. For example, the silica may be applied by chemical vapor deposition of an alkoxysilane, by sputtering, or by deposition from a solution of tetramethylorthosilicate. Care must be taken in the coating to assure a complete coverage of the substrate, a uniform thickness of silica, and purity of the coating as applied. Choice of the coating technique may be dependent upon such factors as the composition of the substrate, and the difficulty of application to all fuel contacting surfaces of the element being protected. The silica coating may be applied in a thickness of from about 0.00005 inches to about 0.001 inches, preferably from about 0.0001 inches to about 0.0005 inches. Such a coating is stable in hydrocarbon fuels, and is thermally stable at temperatures from about minus 200° F. to about 2500°. Sub-coats or bond coats may be applied if necessary to achieve an adherent bonding to the substrate. Conventional cleaning and preparatory steps should be taken prior to deposition of the coating to enhance adherence.

A number of primary factors were identified which relate to the deposition of hydrocarbons in gas turbines. These include fuel composition, temperature, time, the availability of oxygen, and the presence of catalytic materials in the surface of the fuel handling components. For an operating gas turbine, each of these factors has an almost infinite number of possible values, with the exception of the composition of the fuel contacting elements of the gas turbine engine itself. Accordingly, the present invention is directed to control of the surface composition of the fuel handling components of the gas turbine engine, and specifically to the provision of silica coatings thereupon to reduce the deposition of carbon, or coking.

Alloys used in hydrocarbon fuel burning engines commonly contain metals which catalyze coke deposition, such as iron, nickel, and chromium. Thermal degradation occurs as a matter of course, and there are periods during the operation of turbine engines when fuel flow is very low, or as in the case of military engine augmentor plumbing, i.e. fuel feed tubes and spray manifolds, there is no fuel flow at all. During such periods, the temperature of the residual fuel left in the plumbing can rise, causing increased coke deposition from accelerated fuel degradation reactions and thermal cracking. The contributions of various metallic hardware surfaces to coke deposition were evaluated with a goal of determining the best method for reducing the formation and adherence of coke. It has been learned that coking may be reduced by application of a surface layer of an anti-coking material to the surfaces of the fuel handling components of a gas turbine engine. Such anti-coking materials may be of a nature to either reduce or inhibit the tendency of coke to adhere to the surface, or, conversely, to enhance the catalysis of the surface and increase the reactivity such that any gums and varnishes which tend to form are caused to react further, breaking them down to gaseous products which are eliminated.

It is also to be noted that the presence of certain particulate metallic oxide materials, such as alumina, ceria, cupric oxide, in the coke inhibiting layer, may add to the surface catalysis. Such particulates should range in size from about 45 microns to about 150 microns, and preferably from about 45 microns to about 75 microns in diameter, and should comprise from about 10 percent to about 45 percent of the volume of the coating layer.

Surfaces which may be coated for prevention of coking include fuel lines, fuel nozzles, augmentor spray manifolds and other hydrocarbon contacting surfaces of gas turbines, such as lubrication systems and breather tubes. Such surfaces may comprise such materials as titanium and titanium alloys, aluminum, stainless steels, and nickel base alloys such as Inconel and Waspaloy. In addition, the present invention may be suitable for prevention of coking on other surfaces, such as copper, zirconium, tantalum, chromium, cobalt, and iron, for example. While the examples which follow relate to coating components fashioned of Waspaloy or Inconel alloys, it is to be understood that the present invention is not to be limited thereto.

To evaluate the effectiveness of experimental coatings in reducing the tendency of jet fuel to form coke deposits on a metal substrate, Waspaloy samples were utilized under conditions simulating the operational conditions to be anticipated in a high performance military aircraft engine. In a typical military flight scenario, fuel is heated as it travels through the fuel plumbing on its way to the combustor and/or augmentor of the engine to be burned. Generally, the fuel flow rate is sufficiently high to limit the effect of those factors which relate to coking. However, during flight, when the augmentor is shut off, spray manifold temperatures in the afterburner section rise considerably, going from about 350° F. to about 1000° F. or higher in some areas. Fuel left in the spray manifold in these areas boils, and with no place to flow, degrades rapidly to form insoluble, sticky, gum-like varnishes, which after a number of cycles results in formation of coke deposits. A similar scenario occurs in the engine combustor fuel nozzles at engine shutdown. However, since the augmentor is cycled on and off much more frequently than the engine is, it is to be expected that the augmentor fuel plumbing would have a higher coking rate than the combustor fuel nozzles. Accordingly, the conditions encountered at the spray manifold of the augmentor section were selected as being representative of conditions which result in coke deposition.

EXAMPLE 1

Coatings of silica, alumina, and tungsten disulfide were initially evaluated for effectiveness against carbon deposition in the liquid phase, i.e. in flowing fuel with no boiling. Silica coatings were applied by dipping in a solution containing 41.3% tetramethylorthosilicate (TMOS), 38.9% methanol, and 19.8% distilled water. The specimen surface was first pre-oxidized at 1000° F. The dip was followed by air drying, and repeated four times, followed by firing at 1000° F. Sol gel alumina coatings were applied in a manner similar to the TMOS silica, but in two sets of four dips each with firings at 1112° F. in vacuum ($10^{-5}$ torr) for 5 hours between dip sets. The tungsten disulfide coatings were applied through an air blast gun at 120 psi, with the gun positioned 10 to 12 inches from the surface. The reductions in coke deposition achieved are set forth in Table I. These are averages of duplicate results as compared to uncoated specimens, subjected to identical conditions.

TABLE 1

| DEPOSIT REDUCTION | |
|---|---|
| Coating Type | Reduction |
| None | — |
| Silica | 28% |
| Alumina | 18% |
| Tungsten disulfide | 5% |

EXAMPLE 2

A second test was conducted using the coked test specimens from the first experiment. In this experiment the ability of each coating to rapidly catalyze the gasification of the deposited coke was evaluated. The coked specimens from Example 1, along with the uncoated blank specimens, were placed in a furnace at 1050° F. for two hours. The oxygen content of the atmosphere in the furnace was lowered with nitrogen to simulate the reduced oxygen environment inside a spray manifold. The results are set forth in Table II. The uncoated specimens showed no observable reduction in coke deposits. The tungsten disulfide coating, however, suffered some coating loss, apparently due to exceeding its upper temperature capability in air. No coating loss was noted for the other coatings.

TABLE II

| DEPOSIT LOSS | |
|---|---|
| Coating Type | Reduction |
| None | — |
| Silica | 100% |
| Alumina | 90% |
| Tungsten disulfide | 100% |

EXAMPLE 3

A Jet Fuel Thermal Oxidation Tester (JFTOT) was used to evaluate various tubes of Waspaloy and Inconel 625 under test conditions chosen to simulate, as closely as possible, the conditions at spray manifold locations of a military jet engine after augmentor cancellation. These conditions were as follows:

| | |
|---|---|
| Temperature: | 575° F. |
| Fuel flow: | 2 ml/minute |
| Pressure: | 400 psi, in air |
| Flow mode: | Recirculate |
| Time: | 8 hours |

Three sets of Waspaloy oxidation test tubes were fabricated having surface finishes of 16, 32, and 63 microinch (u"), respectively, as well as one set of Inconel 625 tubes with a 32 microinch finish. Coatings of silica ($SiO_2$), gold (Au), and tungsten disulfide ($WS_2$) were applied to sections of the test tubes for evaluation.

The silica coatings were applied by two different techniques. The first was by a conventional sputtering method, and the second by dipping the test tubes in a solution containing 25 grams of tetramethylorthosilicate (TMOS), 30 ml methanol, and 12 ml distilled water. The dip was followed by air drying, and then repeated four times. The coating was then heated at 150° F. to 200° F. for 30 minutes.

The tungsten disulfide coating was applied through an air blast gun at 120 psi, with the gun positioned 10 to 12 inches from the surface. Tungsten disulfide does not adhere to itself, and therefore only a monolayer thickness of about 0.00002 inches or less was obtained. Alternatively, a thin layer of tungsten disulfide may be applied by mechanically brushing on a pre-oxidized Waspaloy surface, with subsequent heating to about 800° F. to produce an adherent layer.

The gold coating was applied to the tube surface from a conventional gold plating bath, with care taken to insure complete coverage with no areas uncoated.

The fuel used for the testing was JP-4 aviation fuel, taken from a single source maintained at constant temperature.

Initially, the Jet Fuel Thermal Oxidation Tester was set up with a quartz heater tube housing to allow the use of a Remote Probe Tube Deposit Rater, which monitored, via strip chart recorder, the decrease in reflected light from the tube surface as carbon deposits are formed. The probe was aligned at the heater tube hot spot as determined by a thermocouple inserted in the longitudinal hole of the heater tube. The Rater provided an estimation of time to the beginning of carbon deposition, and the rate of formation of the deposit. Since this device is an optical sensor, and coke deposit density is variable, no quantitative weight conversions were possible for this test. However, calculations of the percentage change in the rate of deposit were made by comparing the slopes of the appropriate uncoated blank test tubes to those of the coated tubes.

Tests were conducted upon Waspaloy 16 microinch, 32 microinch, and 63 microinch uncoated tubes, and the coated tubes. Test results are shown in Table III, below.

TABLE III

| OPTICAL TEST RESULTS | | |
|---|---|---|
| Tube type/coating | Slope | Reduction |
| Waspaloy, 16 u"/none | 0.1203 | — |
| Waspaloy, 32 u"/none | 0.1111 | — |
| Waspaloy, 63 u"/none | 0.1008 | — |
| Inconel 625, 32 u"/none | 0.1918 | — |
| Waspaloy, 32 u"/$SiO_2$ sput. | 0.1350 | 21.5% inc |
| Inconel, 32 u"/$SiO_2$ sput. | 0.1340 | 30.1% |
| Waspaloy, 32 u"/$WS_2$ | 0.0675 | 39.0% |

TABLE III-continued

| OPTICAL TEST RESULTS | | |
|---|---|---|
| Tube type/coating | Slope | Reduction |
| Waspaloy, 63 u"/Au | 0.0691 | 37.6% |

The deposit rate reduction for the Inconel 625, 32 microinch surface finish, with a sputtered silica coating was 30%, but for a Waspaloy, 32 microinch surface finish with the same coating, an increase in deposit rate of 21.5% was obtained. It was also noted that the deposit rates (slopes) for both were nearly identical, indicating that during sputtering catalytic impurities were introduced to both coatings, causing deposit to form at the same rate on both tubes. Accordingly, these results were not considered indicative of silica coating performance.

The tungsten disulfide coated Waspaloy, 32 microinch surface finish, and the gold plated Waspaloy, 63 microinch surface finish tubes provided deposition rate reductions of 39% and 37.6%, respectively. The gold surface was considered to present questions of long term durability, however, as well as expense, and was dropped from further consideration.

While the light reflective mechanism of the above tests provides a good means for the determination of time to on-set of coke deposition, and deposition rate, it is also desirable to know what the long term deposition rate is. Therefore, using the same Jet Fuel Thermal Oxidation Tester conditions, but with the Remote Probe Tube Deposit Rater removed, a gravimetric analysis was made of a series of tests at 4, 8, 16, and 24 hours. The tube weight gains were evaluated for both amount and reproducibility.

In the first series of the gravimetric tests, a Hot Liquid Process Simulator, an expanded capacity Oxidation Tester, was utilized. Uncoated Waspaloy, 32 microinch surface finish tubes were run to establish a new coke deposition baseline. As shown in Table IV, the tungsten disulfide coated Waspaloy, 32 microinch surface finish tube produced an average weight reduction of 87%.

During a subsequent test run using a TMOS silica coated tube, the Hot Liquid Process Simulator pump failed, necessitating resumption of testing on the original Jet Fuel Thermal Oxidation Tester. After running an uncoated Waspaloy, 32 microinch surface finish tube to establish a new baseline, additional coated tubes were run on TMOS silic coated Waspaloy 16 microinch, 32 microinch, and 63 microinch finish surface tubes. Results are set forth in Table IV.

TABLE IV

| GRAVIMETRIC TEST RESULTS | | |
|---|---|---|
| Tube type/coating | Deposit | Reduction |
| Waspaloy, 32 u"/uncoated | 5.330 mg | — |
| Waspaloy, 32 u"/$WS_2$ | 0.680 mg | 87.2% |
| Waspaloy, 32 u"/uncoated | 0.950 mg | — |
| Waspaloy, 16 u"/TMOS $SiO_2$ | 0.775 mg | 18.4% |
| Waspaloy, 32 u"/TMOS $SiO_2$ | 0.705 mg | 25.8% |
| Waspaloy, 63 u"/TMOS $SiO_2$ | 1.070 mg | 12.6% inc |

The TMOS silica coated Waspaloy yielded significant reductions in coke deposition on both the 16 microinch and 32 microinch surface finishes. The TMOS silica coated Waspaloy, with the 63 microinch surface finish showed no reduction in deposit.

EXAMPLE 4

Considering these results, the same coatings were tested to determine their ability to promote the gasification of coke deposits under conditions similar to those thought to exist in an operating engine between augmentation cycles, i.e. after shutdown of the afterburners. If such were the case, and the specific coating did not permit a greater coke deposition rate than did the Waspaloy, then the initial deposits which did form might be removed during higher temperature periods when the augmentor was shut down. If the removal rate were great enough, then deposits would be removed almost as they formed.

To do this, a furnace was set up with a nitrogen purge to reduce the air content to approximate that existing in the spray ring area after augmentor cancellation. Blank and coated Waspaloy Jet Fuel Thermal Oxidation Tester tubes which had been previously coked as in Example 3 were placed in the furnace and heated to 1050° F. for two hours. Weight changes were recorded, but apparently substrate oxidation weight gains offset some weight loss from coke gasification, as apparent from examination of the tubes under magnification. The uncoated (blank) tubes had lost some, but very little, deposit. The coated tubes ranked as set forth in Table V with respect to the reduction of coke deposit.

TABLE V

| Coating type | DEPOSIT LOSS Reduction |
| --- | --- |
| Tungsten Disulfide | 30% |
| Sol gel alumina | 90% |
| TMOS silica | 100% |

These results are indicative that even if small coke deposits occur during augmentation cycling, those deposits may be completely gasified during the "off" cycle of the augmentor, if the augmentor surface is protected by a coating of silica. These results also indicate that protective surface coatings may be applied to fuel contacting elements to inhibit carbon degradation and coking. It may also be seen from the results shown in Examples 1 through 3 that as the surface chemical reactivity (i.e. catalytic nature), roughness, and/or porosity, of the substrate increases, one may anticipate increased carbon deposition.

It is to be understood that the above description of the present invention is subject to considerable modification, change, and adaptation by those skilled in the art to which it pertains, and that such modifications, changes, and adaptations are to be considered within the scope of the present invention, which is set forth by the appended claims.

What is claimed is:

1. A method for the inhibition of coke formation on a gas turbine engine element in contact with a liquid hydrocarbon fuel at a temperature range of from about 350° F. to about 1000° F., said element comprising a metal selected from the group consisting of titanium, titanium alloys, aluminum, stainless steel, and nickel base superalloys, said method comprising preoxidizing the surface of said element, and applying an adherent inert layer of silica to the surface of said element by deposition from a solution of tetramethylorthosilicate, wherein said layer of silica is from about 0.00005 inches to about 0.001 inches in thickness and further comprises metallic oxide particles selected from the group consisting of alumina, ceria, and cupric oxide.

2. The method of claim 1, wherein said particles are from about 45 microns to about 150 microns in size.

3. The method of claim 2, wherein said particles comprise from about 10 percent to about 45 percent of the volume of said layer.

* * * * *